United States Patent [19]
Brennan, Sr.

[11] Patent Number: 5,645,272
[45] Date of Patent: Jul. 8, 1997

[54] LIFTING AND POSITIONING DEVICE FOR CABINETS AND CONSTRUCTION PANELS

[75] Inventor: Richard Brennan, Sr., North Babylon, N.Y.

[73] Assignee: KimRick, Incorporated, Bayonne, N.J.

[21] Appl. No.: 349,801

[22] Filed: Dec. 6, 1994

Related U.S. Application Data

[62] Division of Ser. No. 171,432, Dec. 22, 1993, abandoned.

[51] Int. Cl.⁶ .................................................. E04G 21/14
[52] U.S. Cl. .................................................. 269/68; 269/904
[58] Field of Search .................................... 269/901, 904, 269/905, 74, 289 R, 68, 91, 82; 108/116, 117, 125, 126, 129, 133; 144/286 R, 286 A; 248/463, 166, 351, 351.1, 354.3, 354.7

[56] References Cited

U.S. PATENT DOCUMENTS

| | | |
|---|---|---|
| 824,777 | 7/1906 | Brooks ........................... 269/904 |
| 1,479,209 | 1/1924 | Topp ............................... 269/901 |
| 1,812,452 | 6/1931 | Shaw ................................ 269/91 |
| 1,849,673 | 3/1932 | Johnston ......................... 269/905 |
| 3,047,165 | 7/1962 | Hutchinson ..................... 269/904 |
| 3,062,603 | 11/1962 | Kamenstein et al. .......... 108/116 |
| 4,157,174 | 6/1979 | Hickman et al. ............... 269/901 |
| 5,102,079 | 4/1992 | Lee .................................. 248/166 |
| 5,160,126 | 11/1992 | Atkinson ......................... 269/904 |

*Primary Examiner*—Robert C. Watson
*Attorney, Agent, or Firm*—C. R. Kiczek

[57] ABSTRACT

A workpiece holder apparatus for either panels or cabinets is disclosed. The holder can be used for either panels or the like or cabinets and assists workers in holding the workpiece, raising the workpiece, and precisely positioning the workpiece into place, thereby facilitating the permanent affixing of the workpiece to the ceiling joist or wall studs and in the case of cabinets installation, against the wall itself. Thereafter, the workpiece holder apparatus can be quickly disassembled after the attachment of the workpiece to the ceiling joist or wall studs.

9 Claims, 5 Drawing Sheets

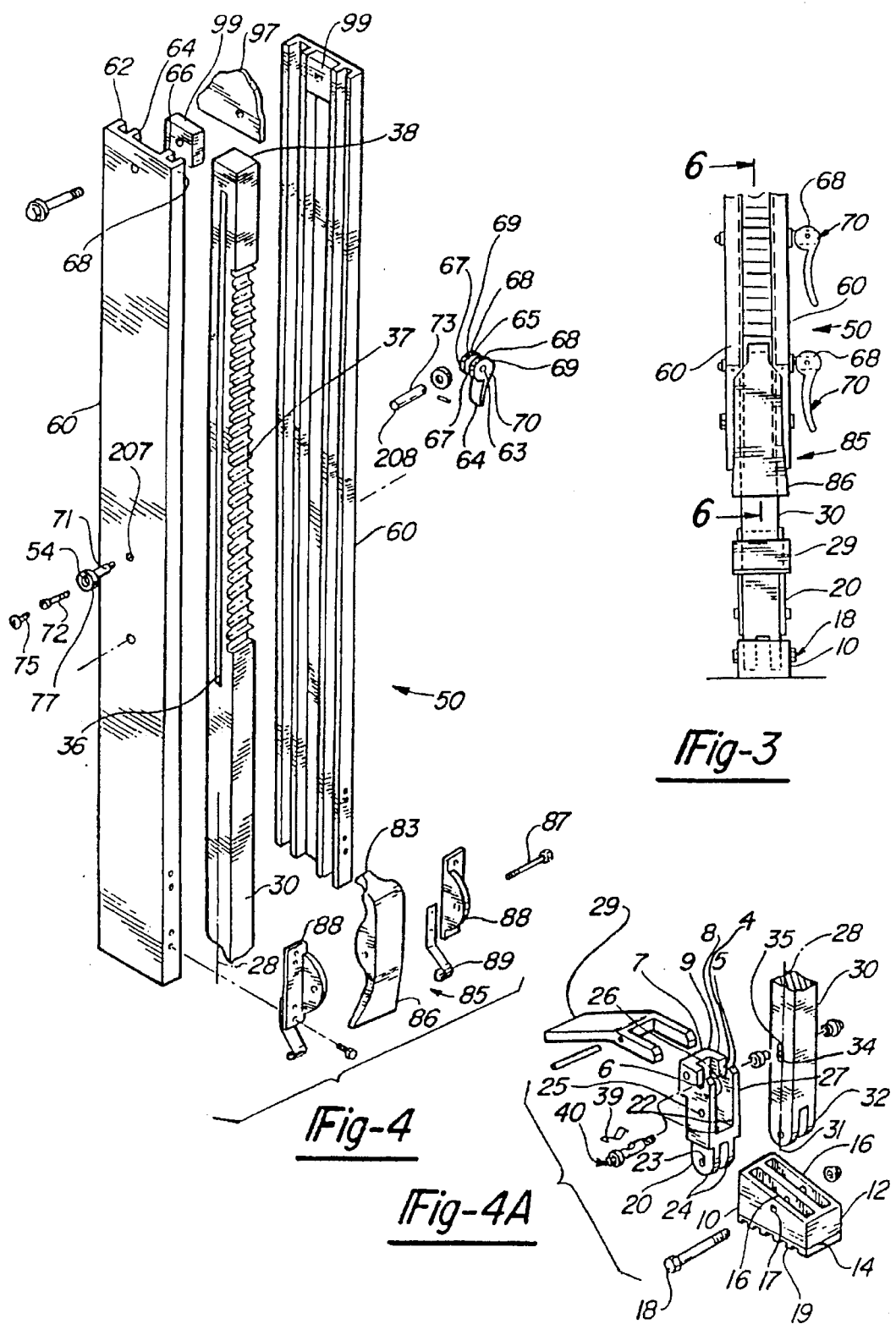

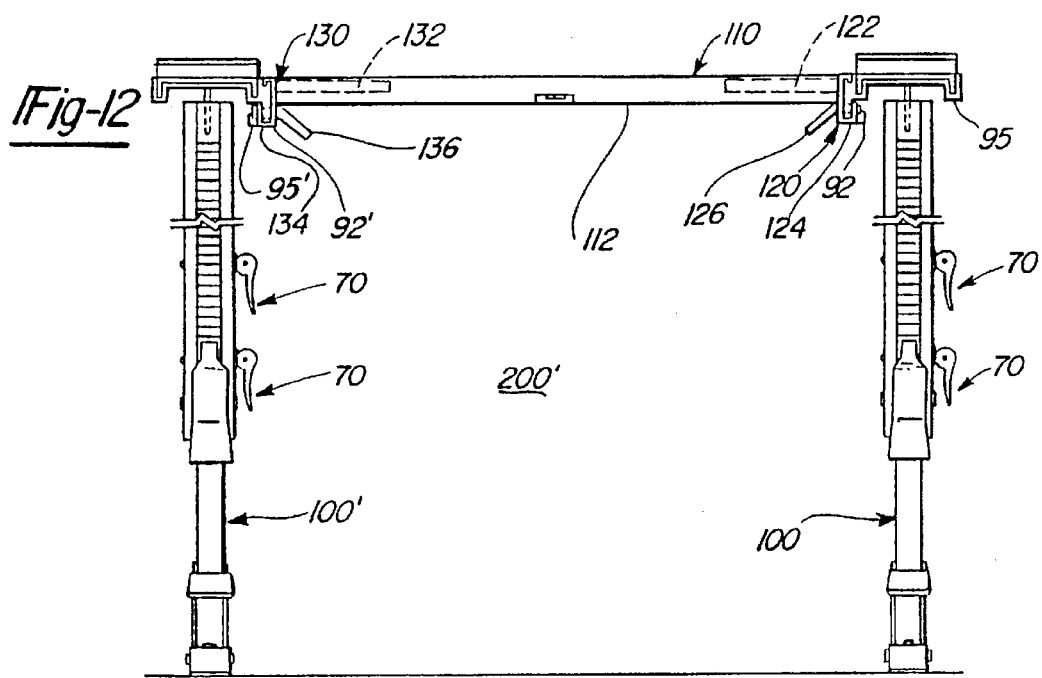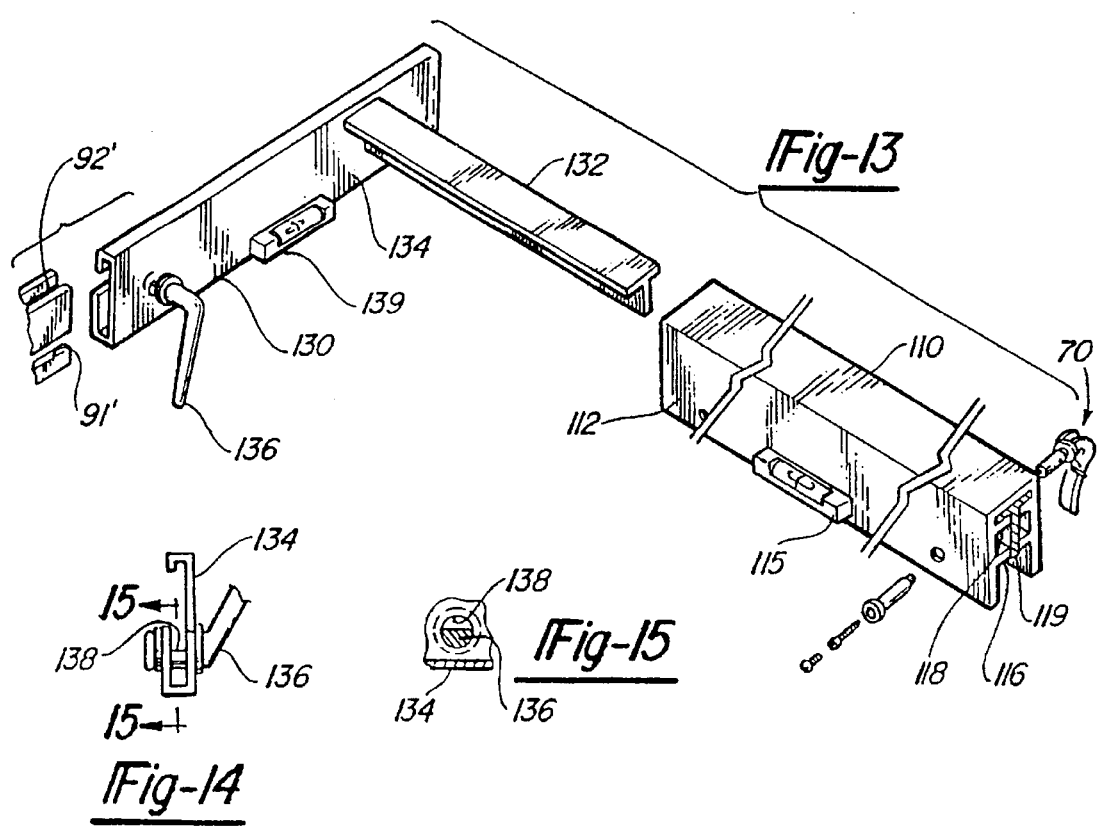

LIFTING AND POSITIONING DEVICE FOR CABINETS AND CONSTRUCTION PANELS

BACKGROUND OF THE INVENTION

This application is a divisional application of U.S. Ser. No. 08/171,432 filed Dec. 22, 1993 now abandoned.

1. Field of the Invention

This invention relates to holding and positioning apparatus for cabinets and construction panels. More particularly, the invention relates to holding devices by which cabinets, sheet rock or other similar panel type materials used in the building industry may be easily held, placed and retained temporarily in position for subsequent permanent installation.

2. Prior Art

In the construction industry, both walls and ceilings are covered with flat, broad coverings having a smooth exposed surface. A prime example of this is sheet rock. In the past, sheet rock has been attached to the ceiling joist using a crew of workers who would manually lift the sheet rock into an overhead position and hold it in place while it is nailed or otherwise secured to the ceiling. Sheet rock and other forms of interior surface finishing panels traditionally used in the building industry are applied to the ceiling or wall frames as the case may be by placing sheets in the order of four foot by eight foot (4'×8'), four foot by twelve foot (4'×12') or larger, against the framing and securing each sheet in place by nailing, screwing, adhesive bonding or by a combination of fastening techniques to achieve permanent installation of the adjacent panels or sheets. Because of the size and weight of the sheet or panel, the installation procedure oftentimes requires at least three people, particularly where each sheet must be retained in an elevated position by two people while nails or screws are inserted by the third person. The installation is complicated further by the requirement in many cases that the installers use step ladders, scaffolding or other forms of movable platforms in order to place the sheet in its ultimate position. In other cases, two people are required, one to hold the workpiece in place, the other to do the affixing. Mounting the sheet rock by this method is difficult, very strenuous and not a particularly efficient procedure.

The problem of properly installing panel materials has been recognized in the prior art. U.S. Pat. No. 1,725,329 issued to A. S. Blandford on Aug. 29, 1929 describes a wall board handling device with a wheeled base, extensible support column and a platform to support the wall board thereon. L. M. White in U.S. Pat. No. 2,242,380 issued on May 20, 1941, describes a wall board tool comprising a lower prop having a rubber floor tip, a supporting fork slidably mounted on the prop, a ceiling board medially and pivotally mounted on the supporting fork and means for releasably locking the fork in any adjusted position on the prop. A ceiling board prop utilizing pivoting arms is described in U.S. Pat. No. 2,379,984 issued to R. Couture on Jun. 26, 1945. In this device, swinging arms which move outwardly provide a support surface for the ceiling board. J. Cooper utilizes a support surface which is moved vertically into position by means of a portable lifting apparatus which is described in U.S. Pat. No. 2,966,993 issued on Jan. 3, 1961. Cooper utilizes a longitudinally extensible tooth jack and a pair of hollow tubes. The device also has a radially extensible arm to support the workpieces thereon. The jack is mounted on casters for free movement on the longitudinal axis of the legs. Leslie G. Love in U.S. Pat. No. 3,179,038 issued on Apr. 13, 1965 discloses a dolly base with casters. Upon the dolly base is placed an extensible column which is provided with a winch means to raise or lower the telescoping extensible extension. Rail members are pivotally mounted to the top of the extensible column to hold the workpieces thereon. A lifting and positioning apparatus for construction panels such as sheet rock is disclosed in U.S. Pat. No. 4,375,934 issued Mar. 8, 1983 to Lewis T. Elliott. The apparatus includes at least one lifting standard having a base, a thick strut supported vertically from the base, a movable strut arrangement supported from the thick strut, a guide and latch arrangement for retaining the struts in generally parallel relationship, a handle on the movable strut for elevating the same in relation to the thick strut and the base, and a panel engaging rail supported on the movable strut. The panel engaging rail is supported at the top of the movable strut, in which case, two of the standard are used to elevate and position a panel against the underside of the ceiling framework. In an alternative embodiment, only one standard is used and includes a cleat-like rail at the bottom of the movable strut to engage the lower edge of the panel to be elevated along the vertical wall framework. In U.S. Pat. No. 4,576,354 issued to William Blessing on Mar. 18, 1986, a panel support column for supporting sheet rock panels in an overhead position during the fixed mounting of the sheet rock panels to a ceiling is disclosed. The panel support column comprises a broad flat bearing plate, rotatably attached to a circular cross-section support rod, a support barrel having a cavity which closely accepts the support rod for reciprocative movement, an upper and lower retaining clamp, a compression spring mounted around the juncture of the support rod and support barrel, and non-slip end cup on the lower end of the support barrel. The support rod has a plurality of height adjusting holes to which the upper clamp can be attached so as to allow adjustment of the height of the panel support column to accommodate ceilings of different heights.

Earl O. Pettit, in U.S. Pat. No. 4,600,348 issued Jul. 15, 1986, describes a panel hoist including a telescopic mast assembly. A collapsible base framework is provided with casters so that the panel hoist can be rolled into position. The collapsible base framework is specially constructed so as to minimize the size of the unit in the collapsed state. Two different head assemblies are provided, depending upon whether the panels are being installed horizontally or upright. The head assemblies are also collapsible.

Finally, F. J. Miller in Canadian Patent 1,024,926 is directed to a panel handling tool having a single support assembly comprising a telescopic, locable tubular section and a platform to support panels or sheet rock thereon.

Equally difficult to install are kitchen cabinets or the like. Similar problems are encountered with the manual lift and support procedure, in that the precise placement of the cabinet in a level position is most difficult. This is so because it is difficult to manually hold the cabinet against the wall while an attempt is made to move the cabinet precisely into place which is necessary for the cabinet to function properly and for a professional looking finished product. Despite the problems associated with mounting cabinets, the prior art has not specifically developed mechanical aides which can assist in holding the cabinet in place against the wall and in a level position during the fastening in place process.

None of the known prior art devices show a panel hoist that is multi-purpose; that is, it can be used for both panels or cabinets. In addition, none of the above devices assist in leveling, is lightweight, compact, inexpensive and easily disassembled.

SUMMARY OF THE INVENTION

In accordance with the present invention, a workpiece holder apparatus is provided with a longitudinal member having a workpiece holding end and an opposite end. A mechanism between the workpiece holding end and the opposite end is provided for adjusting the length of the longitudinal member and finally a clamping mechanism is mounted on the longitudinal member.

Accordingly, it is an object of this invention to provide a workpiece holder which assists workers in raising workpieces into place and thereafter holding the workpiece in place while it is precisely positioned and permanently affixing it to the ceiling joist or wall studs and in the case of cabinet installation against the wall itself; thereafter, it can be disassembled quickly and easily for the next job.

It is still another object of the present invention to provide a workpiece holder which is capable of being used in one of either two support configurations, which is lightweight and is capable of being converted into a compact unit for ease of transportation.

It is still a further object of the invention to provide a workpiece holder which is reliable, easy to construct, easy to assemble and disassemble and efficient in the performance of its desired duties.

These and other objects and advantages of the present invention will be apparent from the description given herein.

BRIEF DESCRIPTION OF THE DRAWINGS

FIG. 3 is a side view of the lower portion of FIG. 2;

FIG. 4 is an exploded view of the channel members and the center leg;

FIG. 4A is an exploded view of the strut member and the foot member;

FIG. 12 is another embodiment of the present invention utilizing two longitudinally extensible members and a T-bar for installing wide panels or a set of cabinets or the like;

FIG. 13 is an exploded view of the T-bar and top member of FIG. 12;

FIG. 14 is a side view of the handle in the left hand adapter plate of FIG. 13;

FIG. 15 is a sectional view along 15—15 of FIG. 14; and

DESCRIPTION OF THE PREFERRED EMBODIMENTS

Figure 1:
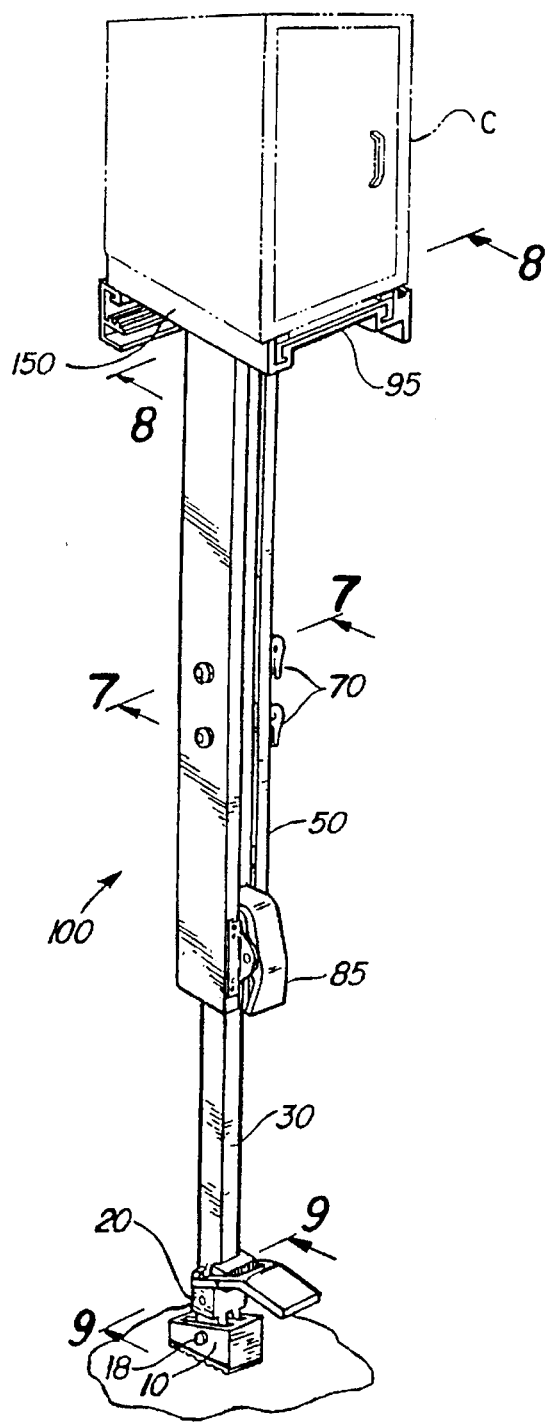
FIG. 1 is a perspective view of the workpiece holder according to my invention.
Figure 2:
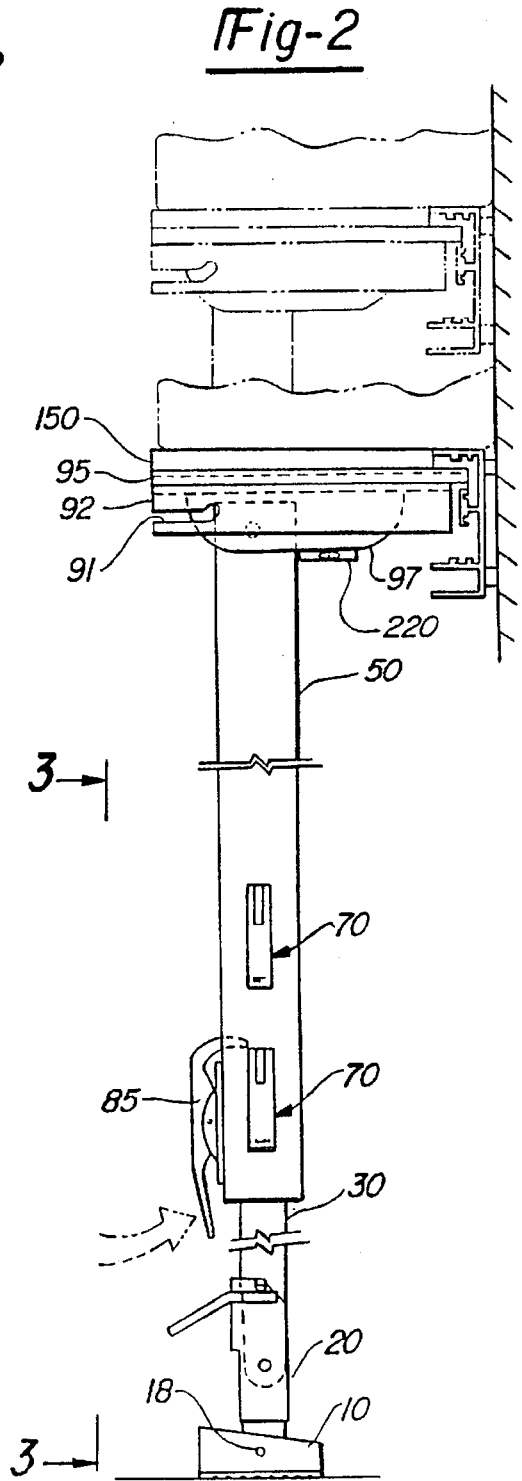
FIG. 2 is a side view of the workpiece holder for cabinets according to my invention.

The workpiece holder according to the preferred embodiment of the present invention is designated by the numeral 100 as shown in FIG. 1. The workpiece holder 100 includes a foot member 10 which is pivotally connected to a strut member 20, a beam member 30 which is mounted within the strut member 20, a longitudinal member 50 slidably mounted around the beam 30, a pair of clamping means 70 secured to the longitudinal member 50, latch means 85 and a workpiece holder 95. A cabinet C or similar workpiece to be installed, is placed on the workpiece holder 95 as is shown in FIGS. 1 and 2.

As is shown in FIG. 4A, the foot member 10 includes a channel member 12. The channel member 12 is preferably made from a lightweight material such as aluminum. The channel member 12 has a bottom 14 and a pair of spaced apart flanges 16 connected to the bottom 14. Each of the flanges 16 has a hole 17 drilled therethrough for a purpose to be described later on. A resilient tooth grid pad 19 is glued or bonded to the bottom 14. Alternatively, foot member 10 may be constructed from a plastic material with a tooth grid pattern molded in the plastic material.

Figure 10:
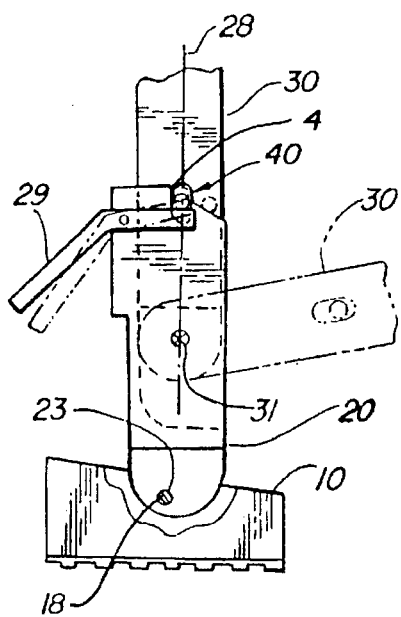
FIG. 10 is a side view of the foot member, strut member and partial center leg.

The strut member 20 is pivotally connected by conventional threaded fasteners 18 to the foot member 10 as is shown in FIGS. 3 and 4A. The strut member 20 is preferably made from a solid, lightweight material such as aluminum and has a box-like form with an open top and an adjacent open side. A pair of spaced apart flanges 24 with a hole drilled through are conventionally fastened to the bottom end of the strut member 20. As best shown in FIG. 10, the first hole 23 is drilled offset toward the closed side of the box-like form of 20, that is from the longitudinal axis of the strut member 20 for a purpose to be described later on. Returning back to FIG. 4A, a second hole 25 is drilled through the first and third sides 26, 27, respectively, of the strut member 20 in a spaced apart relationship to the first hole 23 and centrally located on longitudinal axis 28 of the strut member 20. The top end 9 in each of the first and third sides 26, 27, respectively, of the strut member 20 has a horizontal edge 8 extending from the closed side 7, a partial hole 6 bored in the horizontal edge 8 above the second hole 25 a vertical surface or stop 4 and an angled surface 5 extending from the partial hole 6 to the open side 22.

A biased handle 29 is pivotally mounted in a hole drilled near the closed side 7 through the first and third sides 26, 27, respectively, of the strut member 20 but below the horizontal edge 8, as shown in FIGS. 4A and 10.

The center beam 30 is an elongated member as is shown in FIG. 4. The center beam is preferably made from a lightweight material such as aluminum. The center beam has a bottom rounded end 32 as in FIG. 4A and an opposite top end 38 as shown in FIG. 4, a hole 31 is drilled through the bottom end 32 along the longitudinal axis 28 of the center beam 30. An elliptical hole 34 is drilled in the center beam 30. The elliptical hole 34 is preferably but not limited to a hole which is dimensionally one-half inch by one quarter inch. The elliptical hole 34 is preferably drilled approximately two and three-quarter inches from the bottom end 32 of the center beam 30. Those skilled in the art will recognize that the distance of the elliptical hole 34 to the bottom end 32 of the center beam 30 can vary depending on the dimensional relationship of the partial hole 6 to the second hole 25 in the strut member 20. The elliptical hole 34 is drilled with its longer axis centered with the longitudinal axis of the center beam. On each side of the elliptical hole, a counter bore 35 is preferably drilled to a depth of approximately ⅛ inch so as to form an elliptical hole which is dimensionally approximately ¾ by ½.

Figures 5, 6:
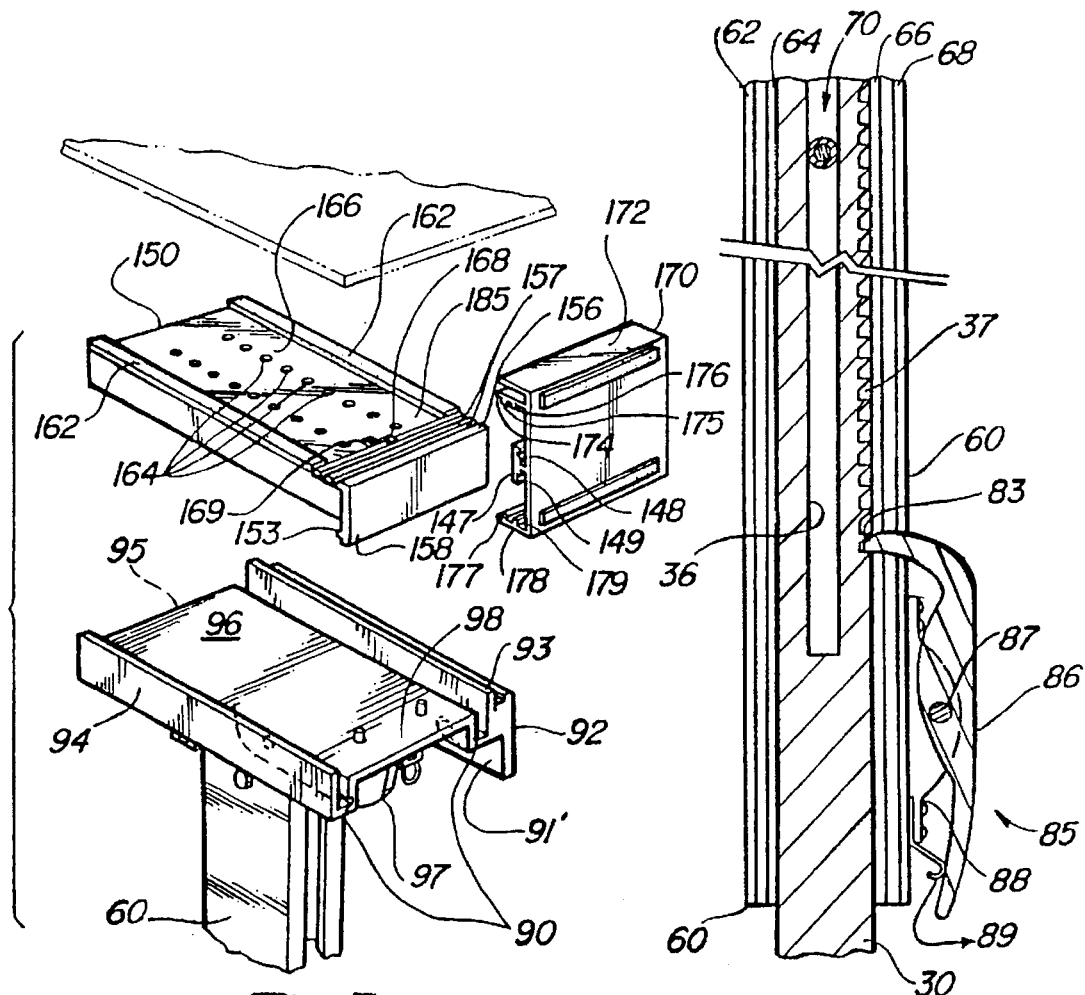
FIG. 5 is an exploded view of the top member for use with panels.
FIG. 6 is a sectional view through 6—6 of FIG. 3.

As shown in FIGS. 4 and 6, an elongated slot 36 is formed in the center beam 30 along its longitudinal axis. Preferably, the slot 36 extends dimensionally approximately 10 inches from the top end 38 to dimensionally approximately 15 inches from the bottom end 32 as shown in FIG. 4A.

Figure 9:
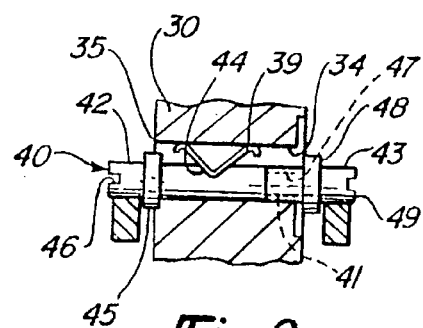
FIG. 9 is a partial sectional view along 9—9 of FIG. 1.

The center beam 30 is pivotally connected to the strut member 20 by means of a conventional threaded member (not shown) inserted through the second hole 25 in the strut member 20 and into the hole 31 drilled into the bottom end 32 of the center leg beam 30 as shown in FIG. 4A. The center beam 30 is positioned relative to the strut member 20 by means of a spring biased collared fastener 40. As best shown in FIG. 9, the collared fastener 40 has a male end 42 and a female end 43. The male end 42 has a cylindrical body with an external threaded end 41, a V-notch 44 in the cylindrical body, a collar 45 and a slotted end 46. The female end 43 is a cylindrical body with a threaded internal bore 47, a collar 48 and a slotted end 49. The threaded bore 47 of the female end threadably engages the external threaded end 41 of the male end 42 when it is inserted into the elliptical hole 34 in the beam member 30. The collars 45, 48, respectively, ride into the counter bore 35 on each side of the elliptical hole 34. A spring member 39 is inserted into V-notch 44 and biases the spring collared fastener 40 towards the hole 31 in the beam member 30. As best shown in FIGS. 4A, 9 and 10, the spring member 39 biases the collared fastener 40 towards the foot member so as to hold the center beam 30 in a substantially vertical position relative to the foot member. The collars 45, 48, respectively, encapsulate the spring biased collared fastener 40 in the elliptical hole 34 and the spring member 39 causes the fastener 40 to engage the partial hole 6 in the strut member 20. A handle 29 is used to move the spring biased collar fastener 40 out of the partial hole 6 in the strut member 20 when a downward force is exerted on the open end of the handle 29 as when the device 100 is in a vertical position. Normally as shown in FIG. 10, the spring biased collared fastener 40 and the threaded fastener in the hole 31 of the beam member 30 hold the beam member 30 so that the beam member 30 is coincident with the longitudinal axis 28 of the strut member 20.

Returning back to FIG. 4, the center beam or longitudinal member 30 also has a series of latch teeth 37 formed or machined thereon. The latch teeth 37 are formed on the side perpendicular to the longitudinal axis of the center beam 30 formed by the hole 31, elliptical hole 34 and the slot 36.

The center beam 30 is inserted into a composite longitudinal member 50 as is shown in FIGS. 3, 4 and 6. The longitudinal composite member 50 includes a pair of channel members 60 preferably made from aluminum. Each of the pair of channel members 60 has a pair of flanges 62, 64 and 66, 68, respectively, to form a double track. The inner flanges 64, 66, respectively, form a groove within which the center beam 30 is guided. The pair of channel members 60 are preferably secured together by a pair of clamping means 70 which will be described later on herein. Those skilled in the art will recognize that only one clamping means 70 of suitable size can also be used in practicing my invention.

As shown in FIGS. 4 and 6, the latch handle means 85 is mounted on the composite longitudinal member 50 to engage the latch teeth 37 on the center beam 30. The latch handle 86 is pivotally supported by a bolt 87 from the pair of spaced apart edges of the flanges 88. One of the pair of flanges 88 is fastened to one of the pair of channels 60 and the other of the pair of flanges 88 is fastened to the other of the pair of channels 60. The latch handle 86 is biased by a spring 89 so that the upper working end 83 of the latch handle is retained against the outer surface of the latch teeth 37 formed on the center beam 30. The working end 83 of the latch handle or pawl is provided with a chamfered surface so that the upward movement of the pawl, as during the lifting movement of the center beam 30, will allow the pawl to slide easily over the series of latch teeth 37. The downward movement of the center beam 30 will be prevented by the engagement of the working end of the pawl on the latch teeth 37.

Figure 7:
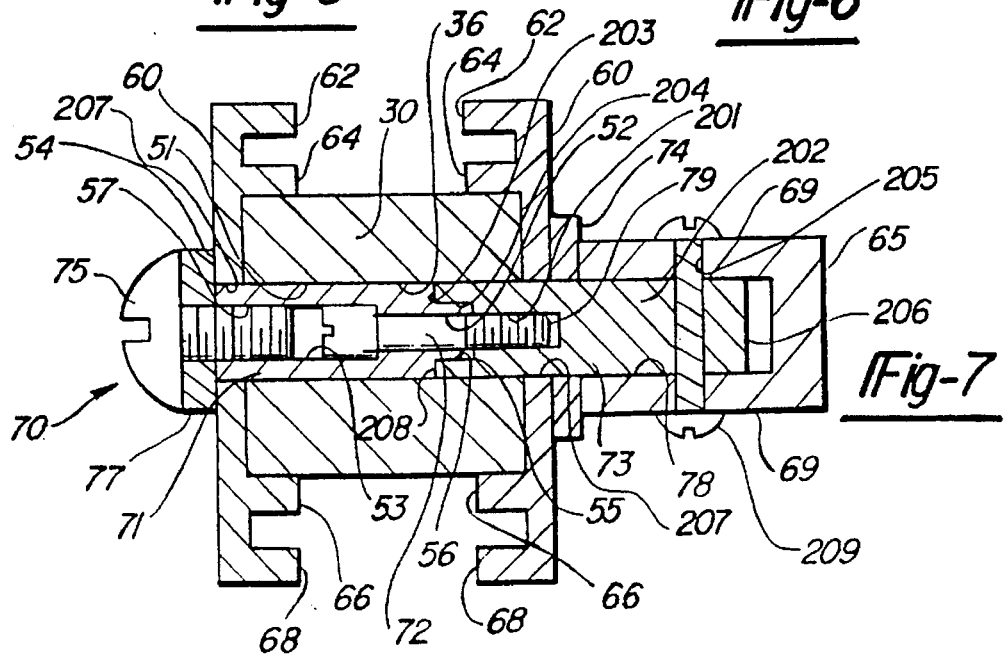
FIG. 7 is a cross-sectional view through 7—7 in FIG. 1.

As is common in most construction projects, there is a need to permit the fine adjustment of the workpiece relative to the structure onto which the workpiece is being installed. To facilitate this fine adjustment, a pair of sandwich clamps or clamping means 70 are provided. As shown in FIGS. 3, 4 and 7, each of the sandwich clamps preferably includes (as best seen in FIG. 7) a first cylindrical member 71, a threaded fastener 72, a second cylindrical member 73, a washer 74, a bolt 75 and a clamp handle 65.

As best viewed in FIG. 7, the first cylindrical member 71 includes a round body with a first outer diameter 51 with a through hole 52 bored along its longitudinal axis and a counter bore 53 drilled part way through from the one end 54. At the one end 54 is a flange 77 formed on the body of the cylindrical member. Optionally, the flange 77 is a separate member or washer. The other end 55 has a necked down portion with a second outer diameter 56 smaller than the first outer diameter 51. Optionally, a partial threaded bore 57 is formed from the one end 54 for a purpose to be described later on herein.

The second cylindrical member 73 includes a first partial threaded bore 201 drilled along the longitudinal axis 202 of the second cylindrical member 73 from its first end 203. A larger counter bore 204 is drilled in the first end 203 for a purpose to be described later on herein. A transverse through hole 205 is drilled through the second cylindrical member 73 near its second end 206.

The first cylindrical member 71 is inserted through a hole 207 drilled in one of the pair of channel members and partially through the slot 36 in the center leg 30 as shown in FIGS. 6 and 4 such that the flange 77 is adjacent to the channel member 60. The first end 208 of the second cylindrical member 73 is inserted through the hole 207 in the opposite channel member 60 as shown in FIG. 4 and thence through the slot 36 in the beam member 30. The larger partial counter bore 204 in the second cylindrical member 73 slips over the second outer diameter 56 of the first cylindrical member 71. A threaded member 72 is inserted through the threaded bore 57 of the first cylindrical member 71, through the bore 52 and engages the threads 79 in the partial bore in the second cylindrical member 73. Nominally, the first and second cylindrical members 71, 73, respectively, do not engage each other and are held together by the threaded member 72. A washer 74 is placed over the outer diameter 78 of the second cylindrical member 73 and abuts the channel member 60.

As best shown in FIG. 4, a clamp handle 65 is provided having an elongated handle portion 64 at one end and two adjacent spaced apart flange portions 69 at the opposite end. Each of the flanges 69 are formed with a flat portion 67 and an arcuate portion 68 as shown in FIGS. 3 and 4 for a purpose to be described later on herein. A hole 63 is drilled through both of the flanges 69. The clamp handle 65 is fastened to the second cylindrical member 73 by a conventional threaded fastener 209 as shown in FIG. 7.

The sandwich clamping means 70 is so constructed so as to permit the center leg or beam member 30 to move freely within the flanges 64 and 66 of the channel members 60 when the flat portion 67 of the flange 69 on the clamp handle 65 abuts the washer 74. When the operator seeks to clamp the center leg 30 relative to the channel members 60, the operator rotates the handle 65 from neutral that is the "flat" portion 67 abutting the washer onto the cam portion so that the larger arcuate portion 68 abuts the washer so as to cam lock or squeeze one channel member 60 toward the other by virtue of the fact that the washers 74, 77, respectively, move toward each other as a result of the handle's arcuate portion 68 moving the washer 74 on the second cylindrical member 73 towards the washer 77 on the first cylindrical member 71. Optionally, a threaded fastener member 75 is fitted in through the one end 207 of the first cylindrical member and engages the threaded bore. The optional fastener 75 prevents dirt or other foreign material from entering into the bore of the first cylindrical member 71 and to hold the flange or washer 77 to the first cylindrical member 71 in the event that the washer 77 and first cylindrical member 71 are made in two pieces.

Figure 8:
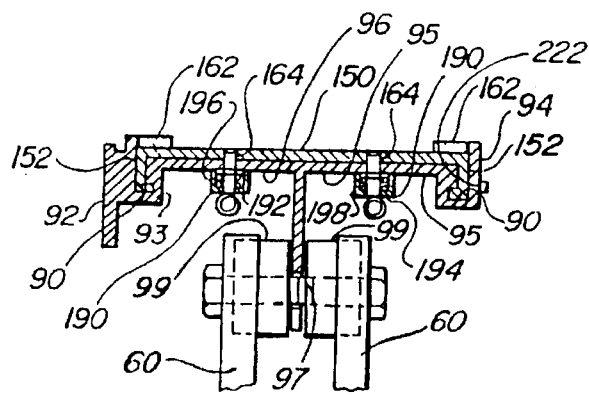
FIG. 8 is a cross-sectional view through 8—8 in FIG. 1.

As shown in FIG. 5, the top member or workholder 95 includes a first supporting member 96 formed in the shape of a tee with two U-shaped ends. The first supporting member 96 is essentially a flat plate preferably 12 inches by 5 inches (but not limited thereto) with a flange 97 extending along the longitudinal axis as shown in FIG. 8. Returning to FIG. 5, at the one end is a U-shaped channel 94 with an approximately 3/16th of an inch opening and extends 1/4 of an inch up from the top surface 98 of the first supporting member 96. The other end has a similar U-shaped channel 93 with a 3/16th inch opening but with an additional vertical flange 92. The flange 92 has a slot 91 formed which is used as a key way for a purpose to be described later on herein. As shown in FIG. 8, the top member 95 also has a pair of substantially equally spaced apart L-shaped slots 90 formed on either side of the flange 97 which forms the tee in the first supporting member 96 earlier described. The top member 95 is pivotally connected to the channel members 60 by means of a conventional fastener through the flange 97 as shown in FIGS. 4 and 8. A pair of stiffeners 99 are positioned on each side of the flange 97 and a bolt inserted through the holes in the channel members and the top flange 97. On the opposite side of the surface 98 of the top plate 95 and on each side of the flange 97, are secured a pair of cylindrical members 190. Each of the cylindrical members 190 contain a spring biased pin which extends through an aperture in the surface 98 of the top plate 95. Each cylindrical member 190 is approximately one inch in outer diameter and is approximately 1¾ inch long. Additionally, each cylindrical member 190 has a threaded inside diameter 192 which is larger than pilot hole 164. A threaded nipple 196 which is approximately one inch long with threads on its outer diameter so as to engage the first threaded inside diameter 192 of the cylindrical member 190. The threaded nipple 196 also has first and second counterbores with a shoulder between the first and second counterbores. A bias member 198, preferably a coiled spring, is inserted into the larger of the two counterbores and is contiguous to the shoulder. A pin member 188 has a collar 186 and an aperture 184 at one end 187. The other end 182 of the pin member is inserted into the larger of the two counterbores and against the bias member 198. The threaded nipple 196, the bias member 198 and the pin member 188 are then assembled into the cylindrical member 190 such that the one end 187 of the pin member 188, that is, the end with the aperture 184, is inserted through the pilot hole 194 of the cylindrical member 190. An "O" shaped ring 180 is fitted through the aperture 184 in one end 187 of the pin member 188. The other end 182 of the pin member 188 protrudes through the aperture and is above the surface 98 of the top plate 95 for a purpose to be described later on herein.

Those skilled in the arts will recognize that surface 98 of the top plate 95 can be angularly adjusted relative to the longitudinal axis of the channel members 60 by loosening and tightening the bolt through the top flange 97. The top plate 95 also has a level 220 formed or secured above the flange 97 (see FIG. 2) and another level 222 formed or secured to channel 94 (see FIG. 8) so as to be visible to the operator.

An installation plate 150 is mounted to the top surface 98 of the workholder 95 as shown in FIG. 5. The installation plate 150 is preferably made of ⅛th thick aluminum and is dimensionally 5 inches wide by 12 inches long (but not limited thereto). Along one end is welded an angle member 158 which is preferably as wide as the plate 150 that is 5 inches wide (but not limited thereto). A pair of cork strips 162 are mounted to the plate 150 and are perpendicular to the angle member 158. The installation plate 150 further has a plurality of equally spaced holes 164 drilled through the top surface 166. One leg 156 of the angle member 158 abuts the cork strips 162 and the other leg 154 of the angle member is perpendicular to the top surface 166.

The angle member 158 also has a pair of notches 157 which run along the length of its one leg 156. The notches are parallel to each other and are adjacent and perpendicular to the cork strips 162 located on the top surface 166 of the installation plate 150. Midway along the edge 185 of the one leg 156, a groove 168 is formed. A flat spring member 169 is attached to the top surface 150 in between the cork strips 162 and adjacent to the edge 185. The other end of the spring normally protrudes above the surface of the leg 156 but when required, fits into the groove 168 for a purpose to be described later on herein.

A finger 153 extends from the other leg 154 and is parallel to notches 157 in the top of one leg 156. The pair of notches 157, the groove 168 and the finger 153 form a guide and holding mechanism for the holder member 170 to fit into the angle member 158.

The holder member 170 is a reversible, multi-purpose structure which can be used either by installing cabinets in one position (or mode) as shown in FIGS. 1 and 2 or panel members in the other position (or other mode) as shown in FIG. 5. The holder member 170 is formed in the shape of a C-shaped channel which is approximately 4 inches wide (but not limited thereto). The top leg 172 of the holder member is approximately ⅛th inch thick. A finger 174 is located approximately ⅝th inches below the top leg 172 and toward the bottom leg 178. The finger 174 is substantially parallel to the top leg 172 and is of the same approximate length, that is 1½ inches. The finger 174 has a first step 175 and a second step 176 formed or secured thereon. The first and second steps 175, 176, respectively, are formed so as to each fit into one of the pair of notches 157 in the angle member 158 when assembled thereto. Similarly, the bottom leg 178 of the holder member 170 also has first and second steps 177, 179, respectively, formed therein so as to fit into the finger 153 of the angle member 158. In one assembled position, the holder member 170 is used to hold panel members (as shown in FIG. 5) and in the other assembled position the holder member 170 is used to position cabinets (as shown in FIG. 16).

The holder member 170 also has a T-shaped member 147 formed or secured conventionally to its web between the bottom leg 178 and the finger 174. The T-shaped member 147 has first and second grooves 148, 149, respectively, formed on its arms. The grooves 148, 149, respectively, fit into the finger 153 formed in the angle member 158. When the apparatus 100 is to be used to hold panels, the first and second steps 175, 176, respectively, of the finger 174 are assembled into the pair of notches 157 of the angle member 158. Additionally, the first groove 148 of the T-shaped member 147 is assembled so as to fit into the finger 153 in the angle member 158. Thus, the holder member 170 forms a C-shaped member to hold panels therein. When the apparatus is to be used to hold cabinets, the first and second steps 177, 179, respectively, of the bottom leg 178 are assembled into the nothces 157 in the angle member 158. Furthermore, the second groove 149 of the T-shaped member 147 is assembled into the finger 153 in the angle member 158. Thus, the top of the holder member 170 is flush with the cork strips 162.

The finger 174 and the bottom leg 178 further have a notch formed or machined in their mid span. The notches in combination with the spring member 169 on the top member 150 serve as a locating and locking mechanism for the holder member 170 when assembled to the angle member 158. To release the holder member 170 from the angle member 158, one pushes the spring member 169 into the groove 168 in the angle member 158. This permits the holder member 170 to slide in the angle member 158 relative to the top member 150.

Figure 16:
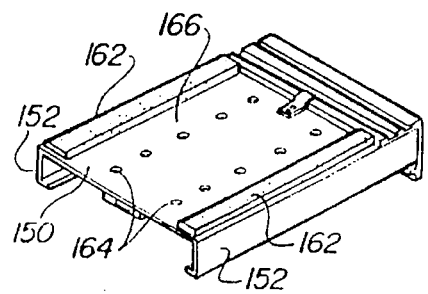
FIG. 16 is a perspective view of the top member.

As shown in FIGS. 8 and 16, the installation plate 150 also has a pair of C-shaped channels 152 attached or formed by conventional means to the top surface 166. When assembled, the C-shaped channels 152 of the installation plate 150, fit into the L-shaped slots 90 formed on the top member 95 as shown in FIG. 8. The position of the installation plate 150 relative to the top member 95 is determined by the alignment of the set of holes 164 as shown in FIG. 16 in the installation plate 150 and the pair of spring biased pin members 190 as shown in FIGS. 5 and 8. The installation plate 150 can be moved relative to the top plate 95 by pulling the "O" rings such that the head of the pin recedes below the surface 98 of the top plate 95. The plate 150 is then free to slide in the track formed by the C-shaped channels 152 in the L-shaped slots 90 formed on top member 95. When the desired position of the installation plate 150 relative to the top member 95 is determined, the holes 164 in the installation plate 150 are aligned with the pin members 190 in the top member 95 and the pin members released such that the other ends of the pins protrude through the holes 164.

The holder member 170 also has a pair of cork strips glued or conventionally secured to its web to act as a cushion or bumper when the holder member 170 is positioned against a wall, as for example in FIG. 2 when cabinets are being installed.

Those skilled in the art will note that the head of the pin members used to secure the installation plate 150 to the top plate 95 must not protrude higher than the top of the cork strips 162 on the installation member 150 and preferably not lower than the top surface 166 as shown in FIG. 8 so as not to damage the workpiece (for example, cabinets or panels) being installed.

As shown in FIG. 5, the installation member 150 is assembled, preferably for use in the installation of sheet rock or similar panel members and is designated as the second installation mode. As shown in FIGS. 1 and 2, the installation member 150 is assembled, preferably for the use in the installation of cabinets or similar units and is designated as the first installation mode.

The workpiece holder 100 in the second installation mode is preferably used to fit panel-like members to walls, studs or ceiling joists. Thus, the workpiece holder 100 with the installation member 150 in the second installation mode is used to fit between studs, in tight closets, in situations where only one person can fit or in a high work area requiring scaffolds or ladders to install panel-like members.

Figure 11:
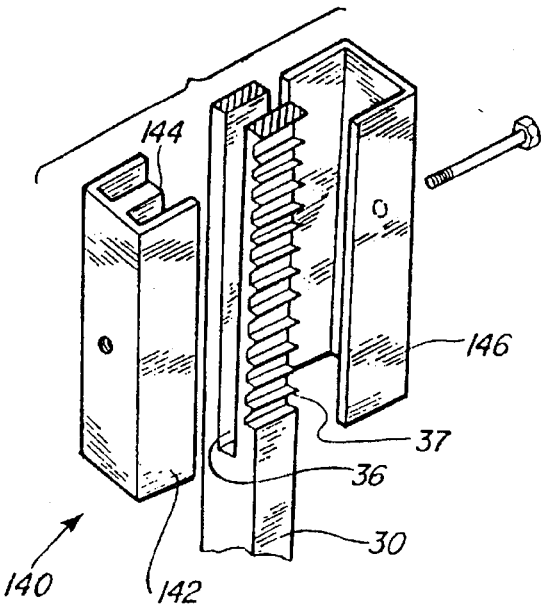
FIG. 11 is an exploded view of the center leg stiffener.

When the device 100 is used in situations where the channel members 60 are moved to an extreme vertical position, the slot 36 formed on the beam member 30 will be below the end of the pair of channel members 60 as shown in FIG. 4. In this situation, a leg stiffener 140 should be used as shown in FIG. 11. As shown in FIG. 11, the leg stiffener 140 includes an E-shaped channel 142 with a center leg 144. The center leg 144 has a hole drilled and tapped through the leg for a purpose to be described later on herein. The center leg 144 is formed so as to slide within the slot 36 of the beam member 30. The other two legs fit around the periphery of the center leg 30. A C-shaped channel 146 has a hole drilled through its center portion and each leg of the C-shaped member fits around the legs of the E-shaped channel 142. When the operator decides to use the stiffener 140, the center leg 144 of the E-shaped channel 142 is inserted into the slot 36 of the channel member 30 and the C-shaped channel 146 is then inserted over the E-shaped channel 142 so that both the E-shaped channel 142 and the C-shaped channel 146, respectively, encapsulate the center leg 30. To hold the two channels 142, 146 together, a threaded fastener as shown in FIG. 11 is inserted through the hole in the E-shaped channel 142 and through the tapped hole in the C-shaped channel 146 and fastened together.

In operation, the foot member 10 is placed on the floor with the strut member 20 and beam member 30 in a longitudinally extensible manner as shown in FIG. 2. With the first installation plate 150 installed on the top member 95, a cabinet C or similar workpiece is placed on the first installation plate 150. The operator then makes sure that the top plate 95 moves freely with regard to the channel members 60 and loosens the clamping means 70. The height of the top plate is adjusted until the work panel is slightly lower than its final height position against the wall framework and the sandwich clamps are then tightened, then the cabinet is leveled and placed in its approximate final position for securing to the wall. The cabinet is adjusted into its final lateral position by placing the holder member 170 in the first installation mode with the cork strips against the wall and kicking the foot member 10 so as to position and level the apparatus 100 firmly against the wall. After screwing the cabinet permanently in place, the operator presses downward on the handle 29 which causes the collared fastener 40 to move vertically so as to move out of the partial hole 6 in the strut member 20 and permits the beam member 30 to pivot at its lower end as shown in FIG. 10 and thereby collapse the device 100.

In FIG. 12, an alternative embodiment of the workpiece holder of the present invention is shown in which the parts corresponding directly with those of the previous embodiment are identified by the same reference numerals, parts serving the same function but modified structurally are identified by the same reference numerals, but primed, and new parts to be described are identified by new reference numerals. Thus, the alternative embodiment of the workpiece holder, identified generally by the reference numeral 200, is intended for use to position at least two cabinets or similar large workpieces against a vertical wall framework. In this instance, the sheet rock is supported on the top of a pair of workpiece holders 100 and 100' and a bridge piece 110. As shown in FIG. 12, the workpiece holders 100 and 100' are of nearly identical construction except for the workholder or the top plate member 95 and constitutes another embodiment of the present invention 100. Top plate 95' is similar to top plate 95 except flange 97' is mounted on the opposite side of the top plate member. Thus, 95' is a mirror image of 95.

As shown in FIGS. 12 and 13, a bridge member 110 connects the workpiece holder 100 to workpiece holder 100' so that wide or multiple cabinets can be positioned for screwing to the wall. The composite tee bar or bridge member 110 includes a left hand adapter plate 130, a right hand adapter plate 120, a liquid bubble level 115, and a cross member 112.

The left hand adapter plate 130 (shown on the left-hand side of FIGS. 12 and 13) has a tee bar 132 connected to a C-shaped channel 134 with a handle 136 pivotally connected to it as shown in FIG. 13. The C-shaped channel 134 is shaped so as to engage the vertical flange formed in the other end of the top member 95'. The C-shaped channel 134 slides into the other end of the top member 95' and the handle 136 is rotated so that the notch 138 and the lower end of the handle engages the slot 91' in the flange 92' as shown in FIGS. 13, 14 and 15. The left hand adapter 130 has a liquid bubble level 139 mounted to the C-shaped channel 134 between the tee bar 132 and the handle 136. In a similar manner, the right hand adapter plate 120 has a tee bar 122 connected to a C-shaped channel 124 with a handle 126 pivotally connected to it. The C-shaped channel 124 also has a liquid bubble level 129 (not shown) mounted between the tee bar 122 and the handle 126. The C-shaped channel 124 slides into the slot 91 (not shown) and the flange 92 of the top member 95 and the handle 126 is rotated so that the notch 128 (not shown) in the lower end of the handle 126 engages the flange in a manner similarly described for handle 136.

As shown in FIG. 12, the tee bar 132 on the left hand adapter plate 130 faces toward the tee bar 122 in the right hand adapter plate 120. As shown in FIGS. 12 and 13, the cross member 112 slidably engages the tee bars 122, 132, respectively, and the member 112 is in the form of a U-shaped member 114 with a pair of internal webs 116, 118, respectively. One of the webs 116 is spaced away from but adjacent to the top of the U-shaped member and the other web 118 is also spaced away from the web 116. The tee bar 112 of the tee bar member 110 slides into the slot or gap 119 formed in the webs 116, 118. A pair of sandwich clamps 70 are fitted through a pair of holes below the slot 119 in the cross member 112. The cross member 112 slidably engages the tee bars 122, 132, respectively, to the desired depth, the sandwich clamps 70 are tightened to clamp the tee bars 122, 132 respectively, into the slot 119 of the cross member 112. The cross member 112 further has a leveling device 115 fastened thereon.

To support a series of cabinets or other similar item, the operator attaches installation plates 150 and 150' (not shown) to top plates 95 and 95'. The height of the workpiece holders 100 and 100' are adjusted to the left and right of the device 200 and the cross member 110 is adjusted to the desired width of the cabinet or a series of cabinets. The tee bars 122, 132, respectively, and cross member 112 are locked securely by the clamping means 70. The clamping means 70 on the pair of channel members 60 on both the workpiece holder 100 and 100' are loosened. The operator then slides the channel members 60 of both workpiece holders 100 and 100', respectively, to the final height with the base of the leg members 10 angled out slightly from the vertical axis to the wall that the workpiece is being fastened to. The operator then locks the clamping means 70 on both workpiece holders 100 and 100' and secures the pair of channels 60 to each of the center beam 30. The cabinet is then placed onto the installation plates 150 and 150' on top plates 95, 95', respectively, of the workpiece holders 100, 100' and the final adjustment to the desired height is accomplished after 158 and 158' are placed against the wall and then by kicking the foot member 10 and 10' of each workpiece holder toward the wall until the workpiece is positioned at the desired height. To verify the level of the workpiece, the liquid bubble level devices 115, 129, 139, respectively, are checked and appropriate adjustments of the workpiece holder 100, 100' are made. After the workpiece is moved against the wall framework and elevated upwardly to the appropriate position, the workpiece is screwed or otherwise affixed permanently in place. Once the cabinet C or other similar object is secured to the wall, the operator releases the workpiece holders 100, 100' by placing his foot on the handle 29 so as to raise the spring biased collared fastener 40 toward the top member 95 and thus disengage the fastener 40 from the partial hole 6 in the strut member 20. This causes the channel member to pivot and disengage from the workpiece.

To install one cabinet C next to another cabinet C', the operator places the top plate member 95 of the workpiece holder 100 under a portion of the previously installed cabinet C with member 158 against the wall. The workpiece holder 100 is then adjusted until all level devices are satisfactory and the cabinet is first secured to the adjacent cabinet and then to the wall. In all other respects the operation of this embodiment is similar to that previously discussed.

While the invention has been described in connection with a pair of preferred embodiments, it will be understood that it is not intended to limit the invention to those embodiments. On the contrary, it is intended to cover all alternatives, modifications and equivalents as may be included within the spirit and scope of the invention as defined by the appended claims.

What I claim is:

1. An apparatus for supporting a workpiece, said apparatus comprising:

a longitudinal member having portions defining a cavity;

a strut member pivotally connected to said longitudinal member, said strut member having a stop and portions defining a partial hole; and a fastener mounted in said cavity, said fastener biased to engage said partial hole so as to hold said strut member and said longitudinal member in a longitudinally extensible position and when said fastener is moved out of said partial hole, said stop causes said longitudinal member to rotate in one direction.

2. An apparatus as claimed in claim 1 wherein said fastener further including a collar.

3. An apparatus as claimed in claim 1 further comprising:

a cylindrical body on said longitudinal member;

a cylindrical member adjacent to said cylindrical body, said cylindrical member having portions defining a bore; and a threaded fastener placed in said bore and threadably engaging said cylindrical body, said threaded fastener adjusting the distance between said cylindrical member to said cylindrical body.

4. An apparatus as claimed in claim 1 further comprising:

a cylindrical lock mounted in said longitudinal member.

5. An apparatus as claimed in claim 1 wherein said fastener further including a spring member to urge said fastener into said partial hole.

6. An apparatus as claimed in claim 1 further comprising:

a handle mounted to said strut member.

7. An apparatus as claimed in claim 1 further comprising:

an extending member mounted to said longitudinal member to adjust the length of said longitudinal member.

8. An apparatus as claimed in claim 1 wherein said longitudinal member further including a workpiece holding end and an opposite end.

9. An apparatus as claimed in claim 8 wherein said stop permits said workpiece holding end of said longitudinal member to move toward said opposite end.

* * * * *